H. E. PEERS.
BATTERY RACK.
APPLICATION FILED JAN. 19, 1920.
1,410,716.
Patented Mar. 28, 1922.
2 SHEETS—SHEET 1.
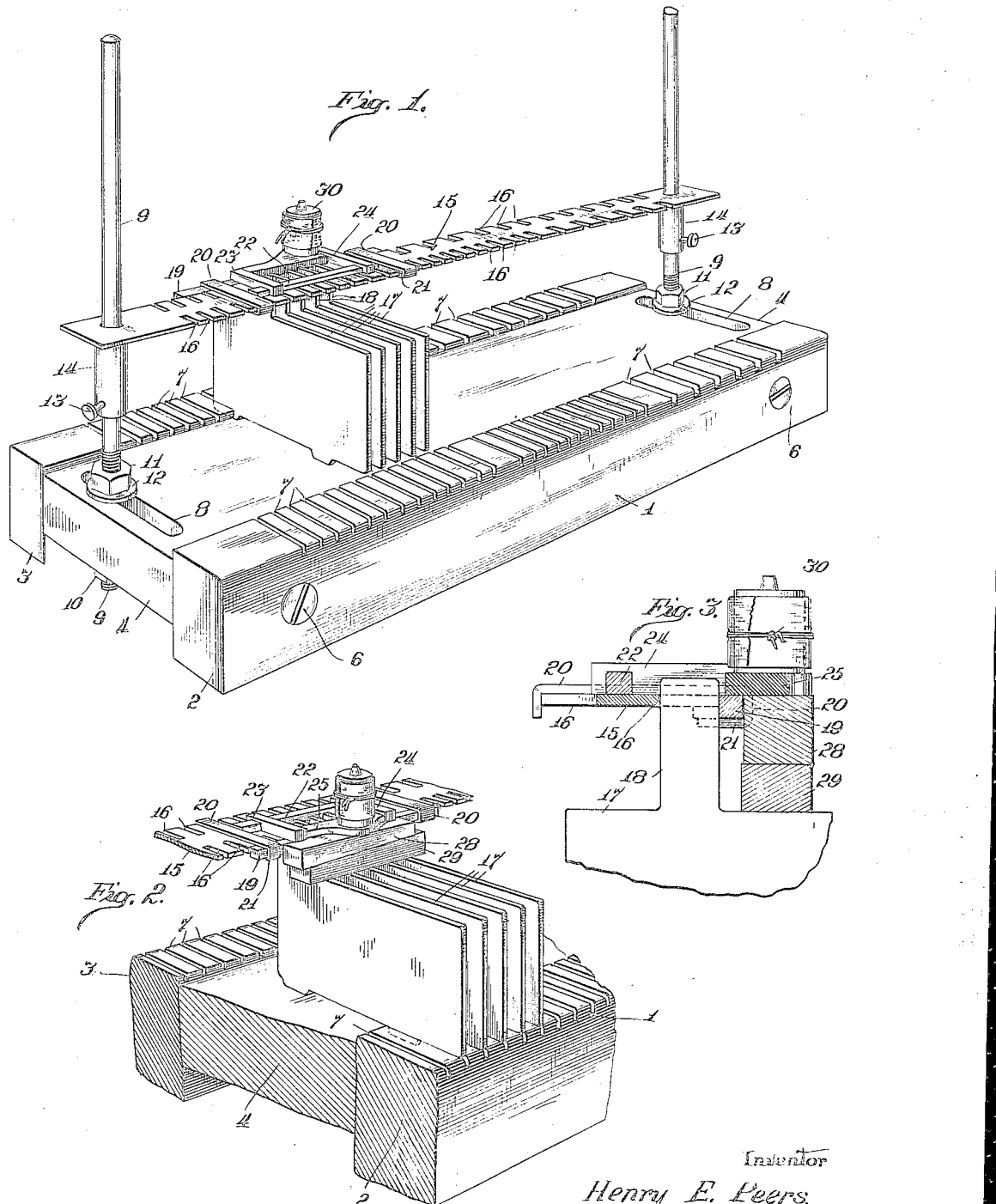
Inventor
Henry E. Peers.
By Daniel J. Brennan.
Attorney.

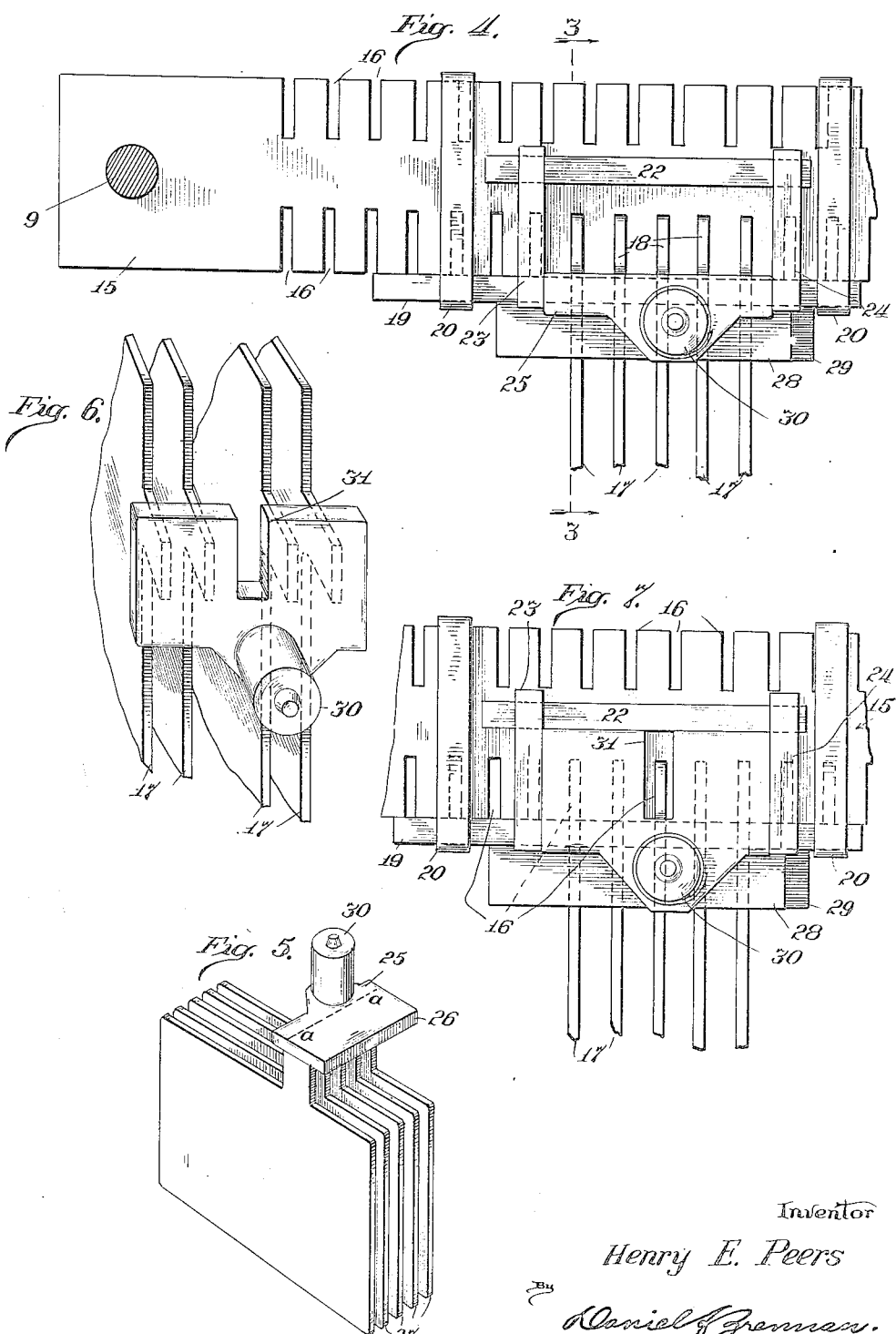

UNITED STATES PATENT OFFICE.

HENRY E. PEERS, OF TOPEKA, KANSAS, ASSIGNOR TO AMERICAN BUREAU OF ENGINEERING, INC., OF CHICAGO, ILLINOIS, A CORPORATION OF ILLINOIS.

BATTERY RACK.

1,410,716.  Specification of Letters Patent.  Patented Mar. 28, 1922.

Application filed January 19, 1920. Serial No. 352,566.

*To all whom it may concern:*

Be it known that I, HENRY E. PEERS, a citizen of the United States, residing at Topeka, county of Shawnee, and State of Kansas, have invented certain new and useful Improvements in Battery Racks, of which the following is a specification.

The invention relates to racks, and more particularly to racks for storage battery plates.

It is an object of the invention to construct a rack which holds the arrangement of battery plates in the proper spaced relationship to each other when it is being used for the purpose of burning the plate terminals to a common strap or bus-bar.

It is a further object to provide a rack adapted to hold plates of various types in proper position.

A still further object constitutes the provision of a vertically adjustable holding member coacting with the rack proper to maintain battery plates of different types in proper position.

It is a further object to provide means for securing the plate lugs or terminals against transverse and longitudinal displacement to facilitate the burning of the bus-bar thereto.

Another object constitutes the provision of an adjustable mold for forming the bus-bar.

It is also an object of the invention to design a rack of simple and cheap construction, capable of being readily disassembled and stored away in a compact container.

To the accomplishment of the objects stated and others that will hereinafter appear, the invention comprises the means described in the following specification, pointed out in the claims forming a part thereof, and illustrated in the accompanying drawings, in which—

Fig. 1 is a perspective view of the rack with battery plates in proper position ready for molding of the bus-bar;

Fig. 2 is a fragmentary perspective view of the rack with the plates in proper position;

Fig. 3 is a transverse section on line 3—3 of Fig. 4;

Fig. 4 is a top plan view of a portion of the rack with the mold ready to receive the melted lead;

Fig. 5 is a perspective view of a series of battery plates joined to a common bus-bar;

Fig. 6 is a fragmentary perspective view of a series of battery plates with an intermediate plate removed, and Fig. 7 is a fragmentary top plan view of the rack with the plates in position to burn an intermediate plate in the common bus-bar.

Referring to the several figures of the drawings, the rack comprises a rectangular frame, generally designated by 1, and including parallel longitudinal members 2 and 3 connected by a transverse spacer 4. The transverse spacer has its upper face slightly below the top surface of the longitudinal members, and its bottom face a considerable distance above the bottom of the longitudinal members to provide a space there-beneath. The frame, adapted to support a plurality of battery plates, is preferably made of wood or other non-metallic material, as the engagement of metal with the wet plates is objectionable. The longitudinal members are secured to the transverse spacer in any approved or convenient manner, such as by gluing or, as indicated, by wood screws 6. The top face of the longitudinal members is formed with a plurality of transverse grooves 7, which are arranged in groups, each group having its grooves spaced equally but differently from the spacing in the other groups. This is provided to accommodate battery plates of different construction and dimensions. The grooves of one longitudinal member are in alignment with the grooves of the other member so that each pair of aligning grooves may receive a plate.

The transverse spacer 4, is formed with elongated slots 8, in which upright bolts 9, constituting guide rods, are disposed. The lower threaded end of rod 9 receives a nut 10, acting on a washer bearing against the lower side of the transverse spacer. The portion of the rod immediately above the bar is also threaded to receive a nut 11, which forces a washer 12 into engagement with the upper face of the transverse bar. Upon tightening of the lower nuts 10, the rods 9 are firmly secured in position. The rods may be adjusted to the extent of the length of the slots 8, for a purpose hereinafter explained. An adjusting sleeve 14 surrounds the rods and is secured in place by a set screw 13. The upper end of the sleeve is reduced to form a shoulder on which a comb 15 is arranged, which has apertures adjacent its ends to receive the reduced upper sleeve portions. The comb 15 is made of high grade steel subjected to treatment in order to render the same rust and acid-proof. The comb is equipped at its opposite longitudinal edges with series of slots 16, open at the outer ends and complemental in size and arrangements to and aligning with the grooves of either of the longitudinal members.

In order to join a plurality of battery plates 17 to a common strap or bus-bar, the plates are arranged in the manner shown in Fig. 1 with their lugs or terminals 18 entering the slots 16 of a proper series of those in the comb 15. To arrange the comb in proper terminal receiving position, the sleeves 14 may be adjusted vertically and, if necessary, the comb may be moved endwise by adjustment of the rods in the slots 8.

After proper setting of the plates, precautions are taken to preclude disalignment of the battery terminals, and to this end an aligning bar 19 is placed to abut against the longitudinal edge of the comb (Fig. 3) and is held in position by a plurality of clamping straps 20 composed of narrow metal strips. Each strap 20 is bent downwardly at one end, to engage the longitudinal edge of the comb remote from the bar 19, while the other end is bent downwardly and inwardly, as at 21, to hold the bar 19 and clamp the same in functional position. The terminals are, of course, freed from impurities by filing or otherwise preparatory to being arranged on the rack.

The bus-bar is cast by pouring lead over the terminal, and to this end a molding frame is provided which comprises a side bar 22 of equal thickness to that which the bus-bar is to be and receiving the notched superposed end bars 23 and 24. The battery post bearing portion closes the frame and remaining open side, and with bars 22, 23 and 24 defines the molding space of the bus-bar. After the terminals have been subjected to the flame of an oxyhydrogen blowpipe or other device and begin to melt, lead is poured into the mold frame until filled therewith. After the terminals and mold have sufficiently cooled the rough edges of the casting must be removed and the bus-bar is then completed.

In Figs. 2 and 3 an arrangement is shown according to which an old post may be used in connection with the bus-bar to be cast, and in this case the bus-bar is sawed off along the dotted line $a$—$a$, shown in Fig. 5, to separate the post bearing strap portion 25 from the portion 26 secured to the plate terminals. To select the proper group of grooves 7 on the rack the whole set of plates 27 may be used as a gauge. The strap portion 25 in this case forms the closing member of the frame 22, 23, 24 and is adjustable in vertical direction by a pair of wedge-shaped blocks 28, 29, whose contacting surfaces are complementarily inclined.

After covering the post 30 with asbestos or other non-inflammable material, the flame of the oxyhydrogen blowpipe is directed against the battery terminals, which also have been freed from impurities, and against the sawed off edge of the strap portion 25 until they begin to melt, whereupon lead is poured into the mold frame.

In case the plates have terminals along the width instead of the length, they may be placed on the rack so that the length extends vertically. Of course, the guide rods and the comb must then be adjusted vertically to allow for the greater height of the plates and must be moved to one side of the longitudinal frame center in order to permit reception of the plate terminals in the comb slots.

If exchange of plates less than the number of plates in a set is necessary, the defective plate or plates are broken off from the bus-bar by engaging the terminals with a pair of pliers and bending the terminals repeatedly until they are broken off; then a slot 31 is sawed out in the bus-bar in the plates from which the terminal was removed. To saw the slot a pair of hacksaw blades are fastened in the frame and spaced sufficiently to equal the width of the required slot. The plates are then set up in the same manner as previously described omitting, however, the adjustable frame for the casting of the bus-bar. The new plate to be secured to the terminal is arranged in position to have its terminal received within the newly formed slot and subsequently the edges of the slot and the new terminal are subjected to the influence of a flame until melting, whereupon lead is poured into the slot sufficient to fill the same out.

While the drawings disclose preferred embodiments of the invention, they are merely indicative of the principle on which the invention is predicated. Various changes and alterations may be made without departing from the spirit of the invention, and I therefore do not limit myself to the details exactly as shown, but want to include all modifications constituting departures within the purview of the invention as defined by the following claims.

I claim:

1. A rack for storage battery plates, comprising a rectangular frame having aligning grooves in its longitudinal members, said grooves being arranged in groups and each group having its grooves spaced equally but different from the spacing in the other groups, and a comb above said frame and vertically and laterally adjustably supported thereby, said comb having slots aligning with the grooves in the several groups.

2. A rack for storage battery plates, comprising a rectangular frame having a plurality of aligning grooves in its longitudinal members, and a comb above said frame and supported thereby and adjustable relative to said frame, said comb having slots in alignment with the grooves in said longitudinal members.

3. A rack for storage battery plates, comprising a rectangular frame having a plurality of aligning grooves in its longitudinal members, and a comb arranged above said frame and supported thereby for vertical and horizontal adjustment relative the frame, said comb having slots in alignment with the grooves in said longitudinal members.

4. A rack for storage battery plates, comprising a rectangular frame, having a plurality of aligning grooves in its longitudinal members, a comb having slots in alignment with said grooves, and means for supporting and holding said comb for vertical and endwise horizontal adjustment relative the frame.

5. A rack for storage battery plates, comprising a rectangular frame having a plurality of aligning grooves in its longitudinal members to receive therein the edges of battery plates, a comb supported above the frame and having slots to receive each one of the plate terminals therein, a bar maintaining said terminals in alignment, and means engaging said comb for maintaining said bar in position on said comb.

6. A rack for storage battery plates, comprising a rectangular frame having a plurality of aligning grooves in its longitudinal members to receive therein the edges of battery plates, a comb supported above the frame and having slots to receive each one of the plate terminals therein, a bar clamped to said comb to maintain the terminals in alignment, and a frame adjustable to various sizes arranged on said comb constituting a mold for the bus-bar.

7. A rack for storage battery plates, comprising a rectangular frame having a plurality of aligning grooves in its longitudinal members to receive therein the edges of battery plates, a comb supported above the frame and having slots to receive each one of the plate terminals therein, a bar clamped to said comb to maintain the terminals in alignment, an adjustable frame arranged on said comb constituting a mold for the bus-bar, and means for clamping the post carrying sawed off strip of an old bus-bar to said comb adjustably relatively said adjustable frame and in position to be welded to the cast bus-bar.

8. In a rack for storage battery plates, the combination of a rectangular frame having a plurality of groups of spaced transverse grooves, a pair of transversely adjustable supports on the frame near the ends thereof, and a comb plate carried by said supports and having a plurality of groups of spaced notches in its opposite longitudinal edges, said notches being complemental in arrangement and size to said groups of grooves, and said plate being vertically adjustable on said supports.

9. In a rack for storage battery plates, a rectangular base frame having a plurality of groups of transverse spaced grooves being arranged in relatively different spaced relationship, vertical supporting members mounted near the ends of said frame and transversely movable relative the longitudinal axis of the frame, a plate supported by and vertically adjustable upon said supporting members, said plate having a plurality of groups of notches in its opposite edges arranged in alinement with and complemental to said groups of grooves, and an adjustable molding frame supported upon said plate.

10. In a rack for storage battery plates, a rectangular base frame having a plurality of groups of transverse spaced grooves, the grooves of said groups being arranged in relatively different spaced relationship, vertical supporting members mounted near the ends of said frame and transversely movable relative the longitudinal axis of the frame, a plate supported by and vertically adjustable upon said supporting members, said plate having a plurality of groups of notches in its opposite edges arranged in alinement with and complemental to said groups of grooves, said grooves being adjusted to receive each one of the units of a series of battery plates, the terminal lugs of which plates lie in complemental notches, and an adjustable molding frame carried on top of said plate and encompassing the terminal lugs of the battery plates.

In testimony whereof I affix my signature at 36 West Randolph Street, Chicago, Illinois, in the presence of two witnesses.

HENRY E. PEERS.

Witnesses:
DANIEL A. BRENNAN,
L. OPIE READ.